(12) United States Patent
Richter et al.

(10) Patent No.: US 7,264,182 B2
(45) Date of Patent: Sep. 4, 2007

(54) METHOD AND DEVICE FOR COMMINUTING PARTICULATE ORGANIC SUBSTANCES IN SUSPENSIONS OF MICROORGANISMS

(75) Inventors: Michael Richter, Niedernhausen (DE); Jochem Unger, Hoechst (DE)

(73) Assignee: Bionik GmbH-Innovative Technik für die Umwelt, Taunusstein (DE)

( * ) Notice: Subject to any disclaimer, the term of this patent is extended or adjusted under 35 U.S.C. 154(b) by 0 days.

(21) Appl. No.: 11/362,922

(22) Filed: Feb. 28, 2006

(65) Prior Publication Data

US 2006/0186039 A1 Aug. 24, 2006

Related U.S. Application Data

(63) Continuation of application No. PCT/EP04/09377, filed on Aug. 21, 2004.

(30) Foreign Application Priority Data

Aug. 29, 2003 (DE) ................. 103 40 282
Sep. 22, 2003 (DE) ................. 103 43 748

(51) Int. Cl.
*B02C 19/06* (2006.01)
(52) U.S. Cl. .................... 241/1; 241/5; 241/21; 241/29
(58) Field of Classification Search .................. 241/39, 241/5, 1, 301, 21, 29; 137/828, 827, 833, 137/842; 210/748
See application file for complete search history.

(56) References Cited

U.S. PATENT DOCUMENTS 6,200,486 B1 3/2001 Chahine et al.

6,505,648 B1 1/2003 Gergely et al.
6,722,594 B2 * 4/2004 Graham ....................... 241/39

FOREIGN PATENT DOCUMENTS

DE 101 55 161 A1 5/2003
DE 102 14 689 A1 10/2003

OTHER PUBLICATIONS

Dichtl et al., Korrespondenz Abwasser, 1997 (44), No. 10, pp. 1726-1738.

* cited by examiner

*Primary Examiner*—Mark Rosenbaum
(74) *Attorney, Agent, or Firm*—Birch, Stewart, Kolasch & Birch, LLP

(57) ABSTRACT

A method and device that comminutes particulate organic substances in suspensions of microorganisms in mediums such as wastewaters or sludges of biological sewage treatment plants, whereby the organic substances are subjected to inertial forces in an active chamber as a result of short-term acceleration, immediately followed by deceleration of a carrier medium flowing in a closed flow channel. To generate these inertial forces, the carrier medium is evaporated and subsequently condensed in the active chamber, whereby this change in the carrier medium's aggregate state is achieved by changing the flow speed. Because of the enormous increase of the liquid phase volume upon its transition into the vapor state, the flow speed of the medium concomitantly increases. As a result, extreme acceleration forces are exerted on the loading of the liquid phase, which immediately after condensation of the vapor into the liquid phase revert back into deceleration forces.

10 Claims, 3 Drawing Sheets

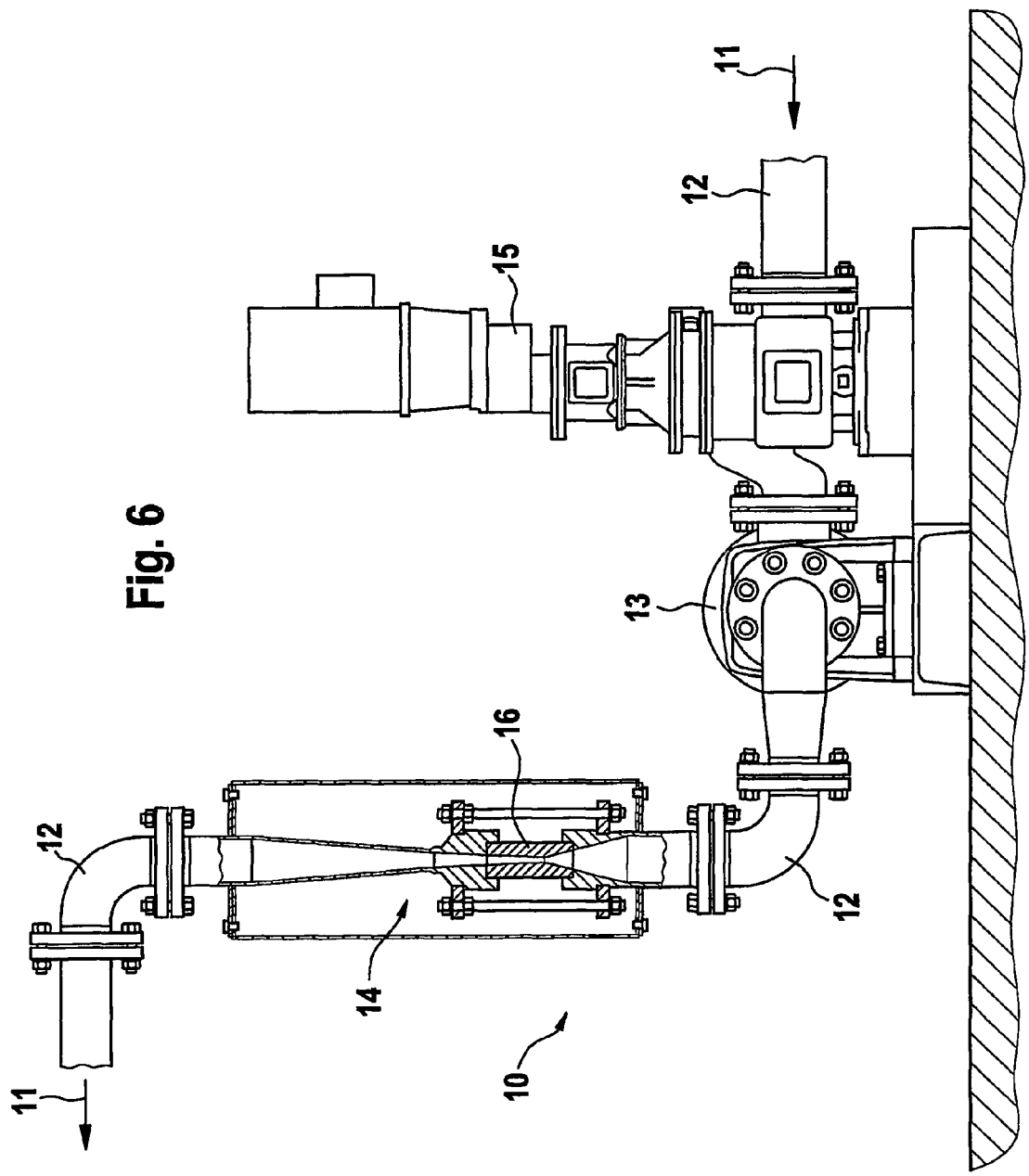

METHOD AND DEVICE FOR COMMINUTING PARTICULATE ORGANIC SUBSTANCES IN SUSPENSIONS OF MICROORGANISMS

This nonprovisional application is a continuation of International Application PCT/EP2004/009377, which was filed on Aug. 21, 2004, and which claims priority to German Patent Application Nos. DE103 40 282.9 and DE 103 43 748.7, which were filed in Germany on Aug. 29, 2003 and Sep. 22, 2003, respectively, and which are all herein incorporated by reference.

BACKGROUND OF THE INVENTION

1. Field of the Invention

The present invention relates to a method and a device for comminuting particulate organic substances in suspensions of microorganisms in a carrier medium, particularly in wastewaters or sludges of biological sewage treatment plants.

2. Description of the Background Art

When wastewater is treated in industrial and municipal biological sewage treatment plants using the so-called activated sludge method, sewage sludge in the form of bacteria suspensions is generated by bacteria due to the metabolism of biodegradable substances. Because this sewage sludge can only be deposited, burned or used in agriculture to a limited degree due to laws and economic constraints, the reduction, or even prevention, of sewage sludge is becoming more and more important.

Over the past few years, the mechanical cell disruption (disintegration) of the organisms in the sewage sludge has been explored as a method for waste reduction. The objective of the disintegration of sewage sludge is to destroy the cell walls of at least a part of the microorganisms contained in the sewage sludge and to release the protoplasts.

Essentially, the objective of this cell disruption is twofold. On the one hand, to improve the anaerobic sludge treatment by accelerated and increased decomposition. The acceleration is based on the mechanical support of hydrolysis because the cell disruption causes the release of the easily degradable intracellular water. Additionally, facultative anaerobic microorganisms are to be disintegrated, which otherwise would partly survive the anaerobic digestion process, and which are in part responsible for the residual content of organic substances in the digested sludge. The cell disruption serves the purpose of exposing them to increased disintegration.

On the other hand, the disintegration is to make it possible to utilize the intracellular water, which contains organic substances like protein and polysaccharide, as an internal carbon source. The objective thereby is to reduce the amount of sludge and the duration of the digestion and to increase the amount of biogas produced for renewable energy. Further advantages are, for example, the destruction of floating sludge and thread bacteria as well as an improvement of the settling properties of the sludges.

A review of the conventional mechanical disintegration methods is given by N. Dichtl, J. Müller, E. Englmann, F. W. Günthert, and M. Osswald in an article "Desintegration von Klärschlamm—ein aktueller Überblick" in "Korrespondenz Abwasser", 1997 (44), No. 10, pages 1726 to 1738 ff. According to the article, suitable for large-scale technical use are primarily: an attrition ball mill; a high pressure homogenizer; and an ultrasound homogenizer.

Whereas in the attrition ball mill, the cell disruption is caused in a cylindrical milling chamber, which is filled with balls of hard glass or ceramic, by the rotation of the balls, cavitation processes are utilized in the ultrasound and high pressure homogenizers for the disruption of the cells.

All conventional methods for mechanical disintegration have in common that monetary and energy expenditures for generating the cavitation processes, which generate the forces that cause a splitting of the cell walls of the microorganisms, are very high. That is true for both the manufacture and the operation and maintenance of high pressure and ultrasound homogenizers. Whereas with high pressure homogenizers, very high pressures have to be generated, which require a very high pump capacity, the ultrasound method requires a great amount of electrical energy to feed the sonotrodes. A further disadvantage of the utilization of cavitation features in this context is that delamination of equipment and materials occur, which is why expensive materials, for example titanium, have to be used, particularly for wear-and-tear intensive components such as the ultrasound sonotrodes.

To reduce the expenditures in energy and equipment for generating cavitation features, it has already been suggested in the older, not published German patent application according to DE 102 14 689 A1, not to utilize equipment and energy-technically expensive ultrasound or high pressure disintegrators for the disruption of organic substances, but instead to convey the suspension under pressure via a nozzle having initially a narrow cross-section and then an expanding cross-section, a so-called Lavel nozzle. By narrowing of the cross-section, the flow speed of the suspension is accelerated such that the pressure falls to a level below the vapor pressure of the carrier substance, namely water, whereas, when passing through the subsequently expanding cross-section, collapsing cavitation bubbles are generated as a result of pressure compensation.

Although the treatment of suspensions such as these through methods with cavitation features has met with success to some degree, that is, it is successful as far as a higher yield of biogas and a reduction of the sludge share is concerned, however, it cannot be clarified without a doubt if these results are due to shear stress in the flow channel, the generation and implosion of the cavitation bubbles, or other effects, which up to now could not be clarified beyond a doubt. In any case, the forming and collapsing of the cavitation bubbles in an implosion-like manner has basically a local effect only; it does not primarily cause the destruction of the cells, and thus the disintegration of the microorganisms.

SUMMARY OF THE INVENTION

It is therefore an object of the present invention to provide a method that allows a focused disintegration of the microorganisms in terms of a destruction of the cells at an analogous low expenditure in material and energy.

According to the invention, the disintegrating effect is achieved by hydrodynamic means. The invention is thereby based on the idea to form, in the course of conveying the suspension in a closed flow channel, particularly a pipeline, an active chamber, where the flow speed of the carrier medium of the suspension, namely the water, is accelerated such that the pressure is reduced to a level below the vapor pressure so that not only do cavitation bubbles form and instantly collapse again, but the liquid phase is practically completely transformed into steam, which, however, condenses again immediately upon leaving this active chamber.

Due to the enormous volume increase of the liquid phase during the transition to the vapor phase, the flow speed of the medium accelerates to the same degree. The result is that the loading of the liquid phase, that is, the bacteria and other particles, which are swept along by the vapor stream, are subjected to extreme acceleration forces, which immediately thereafter change back into deceleration forces upon condensation of the vapor into the liquid phase. As a consequence of the inertia of the particles, particularly the cells' nuclei towards the plasma and the plasma membrane, forces are brought upon the particles due to the change of the aggregate state of the carrier medium surrounding the microorganisms, which already have effects, from structure changes of sludge flakes to alterations of the properties on the membrane surface, without destroying the microorganisms and releasing their substances of content. In particular, by stretching the membrane surface of the microorganisms through the inertial forces, which does not yet cause rupture, surface-active substances can already be separated from the microorganisms before the inertial forces finally cause the rupture of the plasma membrane and thus a destruction of the cells.

It is particularly beneficial that by manipulating the flow speed of the carrier medium, different treatment methods of the suspension in the active chamber can be selected, which range from breaking up large flakes and the destruction of thread-shaped bacteria all the way to complete cell disruption.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 6 shows a diagram of a disintegration system including a device according to the invention.

DETAILED DESCRIPTION

A feature of the invention—in a physical sense—is an active chamber, which is formed in the course of the conveyance of the suspension to be treated through a flow channel. It is indicated schematically in FIG. 1, how a suspension is actually conveyed from the dormancy of a container (initial speed u≈0) at ambient pressure $p_0$ via a pump 1 by deploying external energy/time $P_{el}$ through a pipeline 2 into an active chamber 3 of a disintegration device. In this active chamber 3, the carrier medium, for example, water, is subjected to phases of extreme acceleration and deceleration due to changes in its aggregate state prior to terminating into an adjacent flow channel 4 at the flow speed u and an ambient pressure $p_0$.

The invention endeavors to increase the flow speed u in the entry region of the active chamber 3 such that detailed vapor bubbles and common cavitation can no longer form in the active chamber itself, but rather that a transition to a complete vapor flow is achieved, which impacts the entire surface of the loading of the carrier medium, that is, the microorganisms, so that they are impacted by an acceleration effect, which immediately thereafter reverts back to deceleration due to condensation of the vapor. As a consequence of this combination of acceleration and deceleration effects, which impacts the inside of the microorganisms, their cell membranes are destroyed in the end and both cell plasma and cell nucleus are released.

Figure 1:
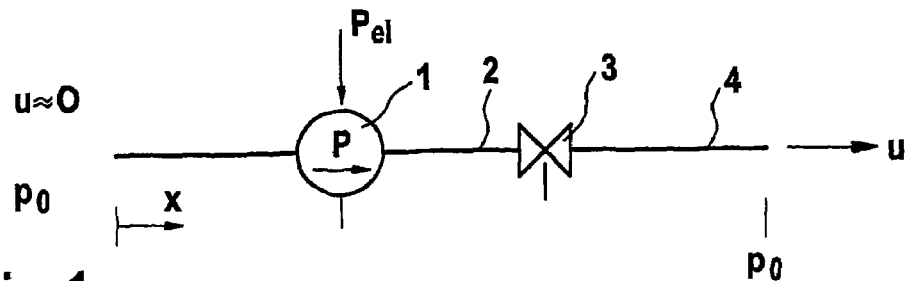
FIG. 1 is a schematic illustration of a conveyor line with pump and active chamber according to the invention.
Figure 2:
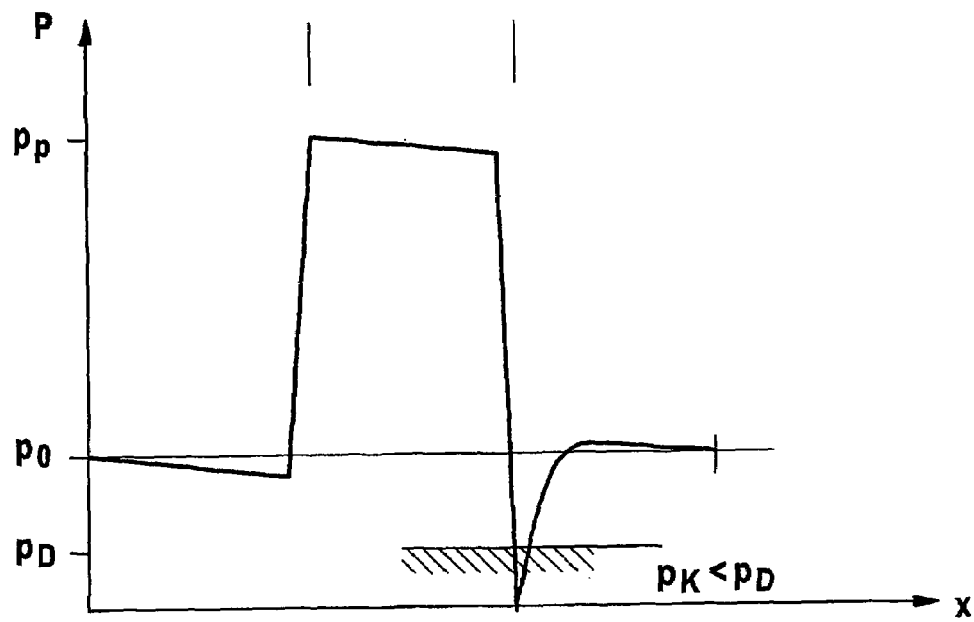
FIGS. 2 and 3 show diagram-like illustrations of the pressure behavior of the suspension in the area of the active chamber.

FIG. 2, with reference to FIG. 1, shows a pressure diagram, wherein rise and fall of the static pressure of the suspension in relation to the conveyor line x are illustrated. Whereas the pressure at the front end of the pump 1 is equal to the ambient pressure $p_O$, it rises in accordance with the electrical output $P_{el}$ of the pump 1 to the operating pressure $p_p$, in order to drop in the active chamber to a pressure $P_K$, which is below the vapor pressure $p_D$ of the carrier medium. After leaving the active chamber 3 and passing through the channel 4, the static pressure in the suspension is once again equal to the ambient pressure $p_0$.

Figure 3:
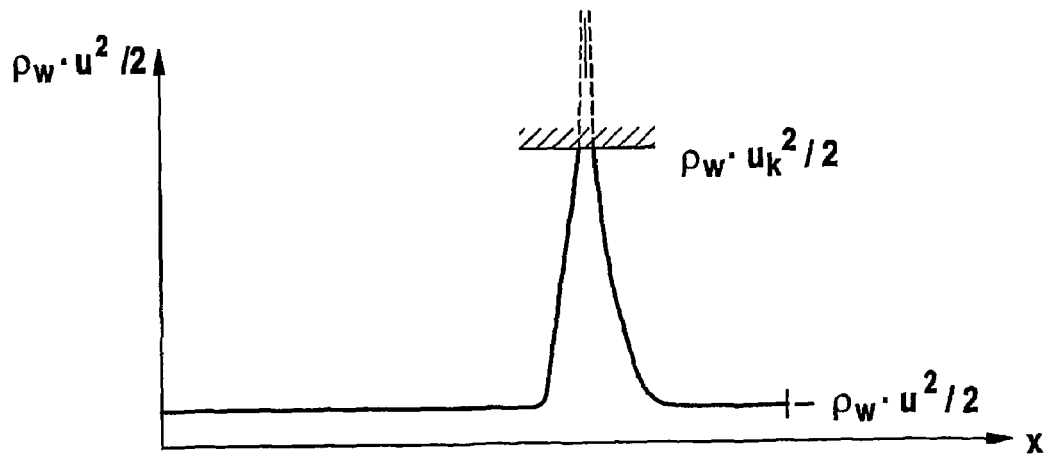

It can be seen in FIG. 3, which shows—again with reference to FIG. 1—a diagram of the flow speed in relation to the conveyor line, how, by accelerating the flow speed of the water, the kinetic energy/volume of the water flow rises to a maximum value $$p_w * u_K^2 / 2$$

upon entry into the active chamber so that the vapor flow can form in the active chamber as a result of the drop of the static pressure below the vapor pressure level. This vapor flow can be utilized for the comminuting, or destruction, of the cellular structures before it drops back to the kinetic energy/volume in the adjacent pipeline 4 due to condensation. Herein, $p_w$ indicates the density of the carrier medium (for water, it is $p_w$=10 kg/m3, for example), and $u_K$ indicates the flow speed upon entry into the active chamber.

Figure 4:
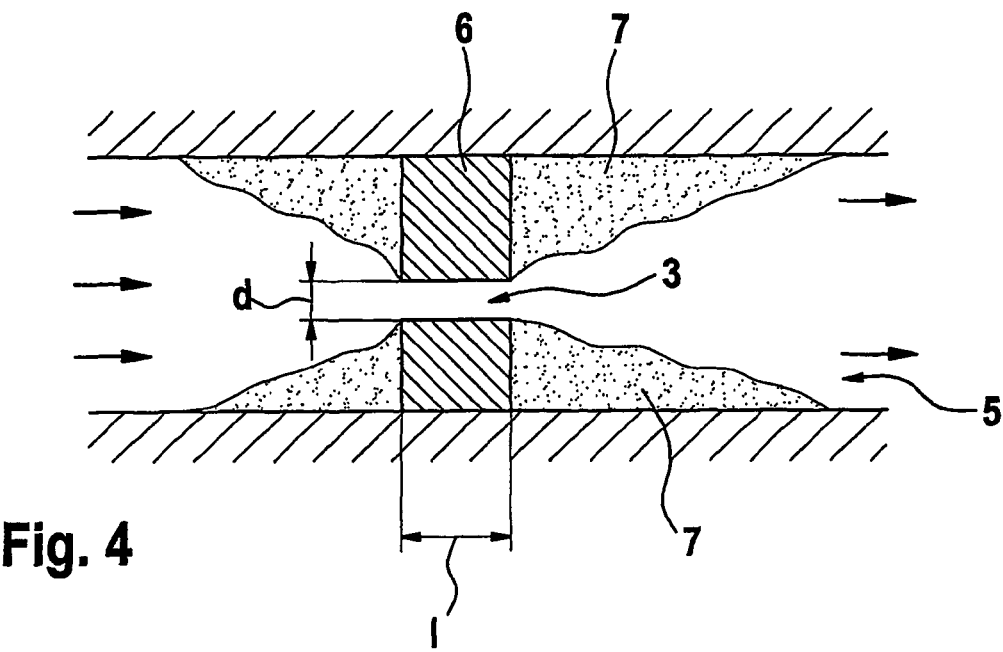
FIG. 4 is a schematic illustration of the forming of the active chamber by way of a restriction choke in a pipe line.

The active chamber 3 can be realized by arranging a restriction choke or screen 6 in the flow channel 5, which causes an extreme narrowing of the cross-section of the flow channel 5 (FIG. 4). By increasing the pressure on the suspension through appropriate pump units and selection of the diameter d of the restriction choke, the flow speed of the suspension can be accelerated along the length l of the restriction choke such that it falls below the vapor level, in other words, the carrier medium, namely water, completely transitions into the vapor phase.

Depending on the speed of the suspension upon entry into the active chamber, the degree of breakup of the cell structures varies; different treatment methods X, which can be defined as a multiplier for a universal, virtually ideal speed $u_{W,id}$ of about 14 m/s (meters per second), can be deduced therefrom. This can be illustrated with a diagram according to FIG. 5.

The universal water speed of $U_{w,id}$ is quasi the "critical" speed, whereby, in theory, the first cavitation features should appear, which in actuality, however, due to friction and other losses, appear at about double the value, that is, at $u_w$≈28 m/s. This leads to the conclusion that the status X=1 only defines the critical speed so that only the state X=2 at a water speed of at $u_w \approx 28$ m/s with the onset of changes in the flake structure can be described as a treatment step. Treatment step X=3 at $u_w \approx 42$ m/s already has an impact on the membrane surface, from releasing surface-active substances all the way to destroying thread-shaped bacteria, whereas the treatment method X=4 at $u_w > \approx 50$ m/s causes the onset of cell disruptions, that is, the destruction of the membranes and release of the inner substances.

For practical purposes, the opening width d and length l of the restriction choke (FIG. 4) are selected such that the acceleration phase and the deceleration phase in particular are utilized for the destruction of the microorganisms. At the same time, the energy expenditure can also be minimized by the appropriate selection of the ratio d:l. A ratio of d:l=1:5 has proven to be beneficial.

During the operation of such a system, deposits will form in the equipment in the accumulation area at the front end of the restriction choke and in the expansion area behind it. An attempt has been made to show these in FIG. 4 around reference numeral 6. Such a cross-section change, which possibly can also cause a noise reduction, is somewhat similar to the conventional Lavel nozzle.

As an example for the technical application of the invention, FIG. 6 schematically shows a system 10, which is part of a two-step disintegration process for wastewater, sewage sludge, or the like. Such a suspension of microorganisms is thereby conveyed in the direction of the arrow 11 through the device 10, which is comprised of a pipeline 12, a conveyor pump 13, and a disintegration device 14 that includes an active chamber according to the present invention.

Preferably, a homogenizing device, for example, a comminuting device 15, is inserted as a first step of the disintegration process for the purpose of making the particle size in the suspension as uniform as possible and to protect the active chamber from coarse substances. Subsequently, the suspension is conveyed by the conveyor pump 13 through the actual disintegration device 14, where the desired destruction of the aggregates and the cell disruption are caused in accordance with the invention.

In the embodiment in FIG. 6, the active chamber is located in the central passageway of a nozzle 16, which in design is similar to a Lavel nozzle, correspondingly having a narrow cross-section. Beneficially, the conveyor cross section of the pipeline 12 narrows steadily to the constricted cross section and subsequently expands again accordingly. For practical purposes, the nozzle 16 is positioned in a vertically extending branch of the pipeline 12 to preclude possible effects of gravity forces on the processes in the active chamber.

As an example for the sizing of the disintegration nozzle 16, the calculation can be based on the treatment of excess sludge with 5-10 percent dry matter and an operational volume stream $V\dot{V}hd\ B = 12$ m³/h.

For the treatment of the loading of the suspension of microorganisms, a speed $u_{W,B}$ of the carrier medium (water), which is still in a liquid state upon entering the active chamber, is selected:

$$u_{w,B} = X * U_{w,id}.$$

Figure 5:
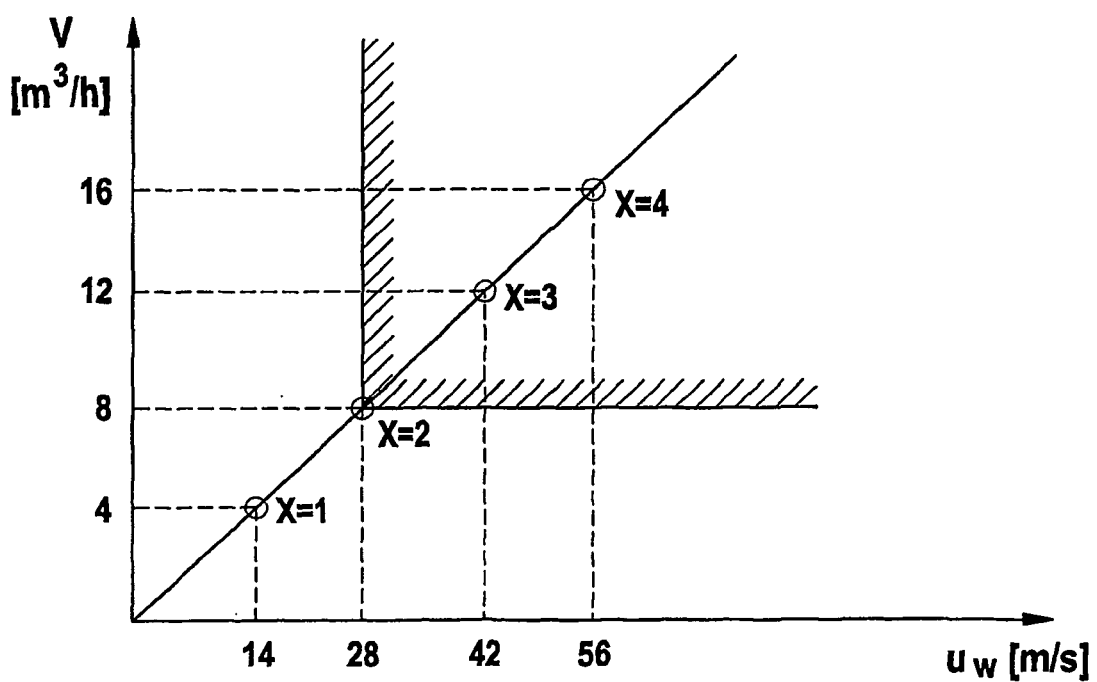
FIG. 5 is a diagram-like illustration of different treatment techniques.

X hereby indicates the multiplier of the treatment method, and $u_{w,id}$ indicates the speed of 14 m/s, which is universal for the carrier medium water. The treatment of the excess sludge is to be done with X=3, which normally assures the desired biological effects in a digestion tower (FIG. 5). The speed selected in this way $$u_{w,B} = 42 \text{ m/s},$$

together with the defined operational volume stream V $\dot{V}_B = 12$ m³/h, results in the required diameter d of the active room:

$$\dot{V}_B = u_{w,B} d^2 \frac{\pi}{4} \rightarrow d = \sqrt{\frac{4\dot{V}_B}{u_{w,B}\pi}} = 10 \text{ mm}$$

The length of the active chamber being l=50 mm is determined such that the change in the aggregate state of the carrier medium (water→water vapor) is assured across the entire active chamber so that the energy supplied by the pump to the system is utilized in the active chamber as intensively as possible for the treatment of the loading (microorganisms).

For dimensioning the pump, the required pressure increase Δp is computed with the accumulation pressure at the entrance of the active chamber taking into consideration the density of the still liquid carrier material (water) of $p^w = 10^3$ kg/m³ as $$\Delta p = \frac{pw}{2} u_{w,B}^2 = 9 \text{ bar}$$

and subsequently, the required hydraulic output is calculated as $$P_{hyd} = \Delta p$$
$$\dot{V}_B = \frac{pw}{2} d^2 \frac{\pi}{4}$$
$$u_w^3 = \frac{\dot{m}}{2}$$
$$u_w^2 = 3 \text{ kW}$$

The calculation is based on the realization that in the end, the hydraulic pump output is solely required for generating the necessary entry speed $u_{w,B}$. Thus, $P_{hyd}$ equals the kinetic energy/time of the flow entering the active chamber.

Lastly, with the mechanical-hydraulic degree of efficiency $\eta \approx 0.5$ of an applicable hydrostatic worm pump, for example, the output $$P = P_{el} = P_{hyd}/\eta = 6 \text{ kW}$$

drawn by the pump from the power supply net can be specified.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for comminuting particulate organic substances in suspensions of microorganisms in a carrier medium, in wastewaters or sludges of biological sewage treatment plants, the method comprising the steps of:

subjecting the organic substances to inertial forces in an active chamber by short-term extreme acceleration of the carrier medium; and decelerating the carrier medium, substantially immediately after the acceleration process of the carrier medium, in a closed flow channel, wherein inertial forces acting on the organic substances are generated so that the carrier medium is evaporated in an entry region of the active chamber and subsequently condensed.

2. The method according to claim 1, wherein changes in an aggregate state of the carrier medium are brought about by changes in a flow speed.

3. The method according to claim 2, wherein an increase in the flow speed is performed by narrowing a cross-section of the flow channel.

4. The method according to claim 1, wherein the suspension is treated in a plurality of subsequent steps.

5. The method according to claim 4, wherein the suspension is conveyed several times through the same active chamber.

6. The method according to claim 1, wherein the suspension is conveyed though the active chamber in a vertical conveyance direction from a bottom up.

7. The method according to claim 1, wherein the carrier medium has a flow speed $u_w$ from about 28 m/s to about 50 m/s.

8. The method according to claim 1, wherein the carrier medium is water.

9. The method according to claim 1, wherein kinetic energy/volume of the carrier medium flow rises to a maximum value $$p_w * u_K^2 / 2$$

upon entry into the active chamber so that vapor flow can form in the active chamber as a result of a drop of static pressure below a vapor pressure level, where $P_w$ is the density of the carrier medium and $u_K$ is the flow speed upon entry into the active chamber.

10. The method according to claim 1, wherein the carrier medium completely transitions into a vapor phase.

* * * * *